United States Patent
Blachman

(10) Patent No.: US 6,200,544 B1
(45) Date of Patent: Mar. 13, 2001

(54) PROCESS FOR REMOVING HCl FROM FLUIDS WITH NOVEL ADSORBENT

(75) Inventor: Marc Blachman, Highland Heights, OH (US)

(73) Assignee: Porocell Corporation, Houston, TX (US)

(*) Notice: Subject to any disclaimer, the term of this patent is extended or adjusted under 35 U.S.C. 154(b) by 0 days.

(21) Appl. No.: 09/239,050

(22) Filed: Jan. 27, 1999

(51) Int. Cl.[7] .............................. C01B 7/00; B01D 15/00; B01D 53/02

(52) U.S. Cl. .................. 423/240 R; 210/679; 210/660; 95/132

(58) Field of Search .................................... 210/679, 660; 95/132; 423/240 R

(56) References Cited

U.S. PATENT DOCUMENTS

| | | |
|---|---|---|
| 2,915,365 | 12/1959 | Saussol . |
| 3,491,031 | 1/1970 | Stoneburner . |
| 3,997,652 * | 12/1976 | Teller ................................ 423/341 |
| 4,531,953 | 7/1985 | Groose et al. . |
| 4,639,259 | 1/1987 | Pearson . |
| 4,762,537 | 8/1988 | Fleming et al. . |
| 5,316,998 | 5/1994 | Lee et al. . |
| 5,505,926 | 4/1996 | Lee et al. . |
| 5,531,809 * | 7/1996 | Golden et al. ..................... 95/101 |
| 5,616,533 | 4/1997 | Tavlarides et al. . |

* cited by examiner

Primary Examiner—Steven P. Griffin
Assistant Examiner—Jonas N. Strickland
(74) Attorney, Agent, or Firm—Kenneth E. Kuffner

(57) ABSTRACT

An adsorbent for removing HCl from fluid streams comprising activated alumina impregnated with alkaline oxide and promoted with phosphate or organic amine or a mixture thereof. A method of making such adsorbent and a method of removing HCl from fluid streams using such adsorbent.

8 Claims, No Drawings

PROCESS FOR REMOVING HCl FROM FLUIDS WITH NOVEL ADSORBENT

FIELD OF THE INVENTION

This invention relates to an adsorbent for removing HCl from fluid streams comprising activated alumina impregnated with alkaline oxide and promoted with phosphate or organic amine or a mixture thereof This invention further relates to a method of making such adsorbent and a method of removing HCl from fluid streams using such adsorbent.

BACKGROUND OF THE INVENTION

HCl is present as an impurity in numerous industrial fluids, i.e. liquid and gas streams. For example, in reforming processes conducted in refineries and petrochemical plants, a chlorine promoted catalyst is generally employed. During the reforming operation, which also generates hydrogen, a small amount of gaseous HCl is produced which is carried away with the product streams, hydrogen-rich gas being one of the streams. The hydrogen containing the HCl is either recycled to the reformer or used in other processing units in which hydrogen is required as a reactant. Accordingly, the small amount of gaseous HCl, an acid gas, present in the hydrogen can seriously interfere with the operation of the process and, in addition, can cause acid-related corrosion and fouling problems. Additionally, there are other processes in which small amounts of HCl are generated and carried away in gas or liquid streams and which must be removed from such streams to prevent corrosion damage to equipment and avoid environmental problems.

It is well known that activated alumina can act as a scavenger for the removal of small quantities of HCl from fluid streams by taking advantage of the inherent physical attraction between activated alumina and HCl (physical adsorption). Typically, HCl scavengers made from alumina are formed into nodules, e.g., spheres, the spheres forming a fixed bed through which the gas to be scavenged flows. Handling and use of the nodules dictates that they possess sufficient crush strength to retain structural integrity.

Because the adsorption capacity of activated alumina is somewhat limited, a number of researchers have investigated methods of enhancing its performance. For example, U.S. Pat. No. 4,762,537 (Fleming et al.) teaches an HCl adsorbent comprising a major amount of activated alumina and a minor amount of acid-treated Y zeolite. Also, U.S. Pat. No. 4,639,259 (Pearson) teaches an HCl adsorbent comprising activated alumina impregnated with an alkaline earth metal salt. Although both of these patents teach enhanced activated alumina adsorbents possessing improved HCl adsorption capacities, neither discusses whether their adsorbent nodules maintain sufficient crush strength (about 15 pounds) to be useful in industrial applications.

The maintenance in promoted activated alumina adsorbents of sufficient nodule crush strength for practical industrial application has been studied by a number of researchers. It has been generally recognized that the HCl adsorption capacity of activated alumina can be increased through the impregnation of the alumina with alkali oxide, but that the percentage of alkali oxide on the finished adsorbent must be limited to avoid reducing the crush strength of the finished adsorbent nodules to below levels acceptable for practical industrial applications. Pearson, the inventor in U.S. Pat. No. 4,63 9,259, later collaborated with Lee in U.S. Pat. No. 5,505,926 (Lee et al.) and U.S. Pat. No. 5,316,998 (Lee et al.) to teach an HCl adsorbent comprising activated alumina impregnated with more than 5 wt. % alkali metal oxide, wherein the crush strength of the finished adsorbent nodules can be maintained at high enough levels for practical industrial application through the use of a water soluble, alkali metal salt of a carboxylic acid containing from 1 to 6 carbon atoms as the promoter precursor.

The incorporation of a metal oxide base in the activated alumina is especially desirable since it means that the user can enjoy longer run times before having to replace the adsorbent, or in the case of new units, can design the units smaller. By increasing the content of promoters such as sodium oxide or calcium oxide, the HCl adsorption capacity of activated alumina can be increased. The improved hydrogen chloride adsorption capacity of alumina impregnated with alkaline or alkaline earth oxides (e.g., $Na_2O$, $CaO$, $MgO$) is attributable to the addition of a second mechanism of HCl adsorption based upon simple acid-base chemistry. The weakly basic metal oxide functions to neutralize the strongly acidic HCl in the process fluid, resulting in the by-products of water and alkali or alkaline earth chloride salt:

$$2HCl + M_2O \rightarrow 2MCl + H_2O$$

M=Li, Na, K $$2HCl + MO \rightarrow MCl_2 + H_2O$$

M=Be, Mg, Ca

Still other researchers have studied the use of amine-impregnated materials as agents for the removal of contaminants from refinery and chemical plant streams. U.S. Pat. No. 3,491,031 (Stoneburner) teaches the use of amine-treated activated carbon to remove acid gases, primarily $CO_2$ but also $NO_2$, $SO_2$, $H_2S$, HCN, $SO_3$ and $CS_2$, from refinery gas streams with MEA being the amine of choice. U.S. Pat. No. 4,531,953 (Groose et al.) teaches removal of toxic gases such as cyanogen chloride from a gas stream with amine-treated activated carbon. And U.S. Pat. No. 5,616,533 (Tavlarides et al.) teaches the use of ceramic (e.g. alumina) to remove metals from liquid streams, wherein one embodiment comprises covalent attachment of thio and amino groups on alumina.

Although activated alumina has been used to scavenge HCl from refinery streams, its use in these services also catalyzes certain side-reactions that are detrimental to refinery operations. Both non-promoted and metal oxide-promoted activated aluminas display these catalytic tendencies to varying degrees. Activated alumina adsorbents tend to promote the polymerization of olefins due to their inherent acidity or resultant acidity from use in such service. Since olefins are commonly present in these applications, the resultant polymer affords a serious deposition and fouling concern to downstream equipment. This chemical reactivity is known in the industry as "Green Oil" formation:

$$nR_2C=CR_2 + H^+ \rightarrow -(R_2C-CR_2)_n - (\text{"Green Oil"})$$

An adsorbent that offers superior HCl-scavenging capacity with reduced tendency to catalyze the formation of Green Oil would be of value to the refining and chemical industries.

SUMMARY OF THE INVENTION

This invention provides for an adsorbent having sufficient nodule crush strength for practical industrial applications, as defined by a minimum of 6.8 kg on a 4 mm. sphere (15 pounds force on a U.S. standard 5 mesh sieve sphere), that is effective in removing HCl from refinery and chemical plant fluid streams. More particularly, this invention provides for such an HCl adsorbent that may be tailored to exhibit superior capacity for HCl removal, reduced tendency to catalyze the formation of Green Oil, or both, depending upon the particular needs of the application in question, by varying the type of promoter employed. The adsorbent of this invention comprises activated alumina impregnated with alkali metal- or alkaline earth-oxide and promoted with phosphate or organic amine or a mixture thereof.

Promotion with a phosphate is effective in increasing the capacity of the alkali-impregnated activated alumina for adsorption of HCl. Those phosphate compounds that have been found to be effective in this invention include (a) the alkali and alkaline earth metal phosphates such as those of Li, Na, K, Be, Mg and Ca, and (b) organic amine phosphates having the general formula $(R_3N)_3PO_4$ wherein $R_3N$ represents any organic amine, which may also be formed in situ by the simultaneous addition of an organic amine and phosphoric acid. Any concentration of phosphate is effective in promoting HCl adsorption, with concentrations of about 0.5 wt. % to 15 wt. % measured as phosphate ion on the alkali-metal-impregnated activated alumina being preferred. Sodium phosphate and potassium phosphate are particularly preferred, in concentrations of about 2 wt. % to 10 wt. % measured as phosphate ion.

Promotion by amine is somewhat effective in increasing the adsorbent's capacity for HCl removal and is particularly effective in reducing the adsorbent's tendency to catalyze the formation of Green Oil. Any organic amine may be used as a promoter, with diethanolamine (DEA) being preferred. The amount of amine used should be between about 0.5 wt. % and about 10 wt. %, with the amine concentration determined by the application to which the adsorbent will be used and the amount of phosphate promoter employed.

To achieve an adsorbent having both highly increased capacity for HCl adsorption and reduced tendency to catalyze the formation of Green Oil, certain phosphates or both phosphate and amine promoters should be used. Either promoter may be used alone, however, to prepare an adsorbent that either exhibits superior HCl adsorption capacity (i.e., phosphate only) or modest improvement in HCl adsorption capacity with reduced tendency to catalyze Green Oil formation (i.e., organic amine only).

This invention also provides a method of making the present adsorbent and a method of removing HCl from refinery and chemical plant fluid streams using said adsorbent.

DETAILED DESCRIPTION OF THE INVENTION

This invention provides for an adsorbent with sufficient nodule crush strength to be suitable for practical industrial applications that is effective in removing HCl from refinery and chemical plant fluid streams comprising activated alumina impregnated with alkali metal- or alkaline earth-oxide and promoted with phosphate or organic amine or a mixture thereof The HCl adsorbent of this invention exhibits superior capacity for HCl removal and reduced tendency to catalyze formation of Green Oil by its promotion with phosphate and/or organic amine.

Adsorbent Composition and Characterization

The adsorbent comprises activated alumina that has been impregnated with alkali metal- or alkaline earth-oxide and promoted with phosphate or organic amine or a mixture thereof.

Activated alumina refers to an alumina having an extended surface area of above about 100 m²/g, preferably above about 150 m²/g, and most preferably above about 200 m²/g. Suitable activated alumina has a total pore volume in excess of 0.35 cm³/g of pore diameter of 40 Å and greater, of which at least 0.10 cm³/g is of a pore diameter of 750 521 and greater. The loss on ignition (LOI) of a suitable activated alumina is typically 2 to 10 wt. %, and preferably between 2 to 3 wt. %, which contrasts to a loss on ignition of a typical material from which activated alumina may be made, e.g., an alumina trihydrate, which is in excess of 30 wt. %.

Impregnation of the activated alumina with either an alkali metal oxide or an alkaline earth oxide is recommended to achieve an enhanced HCl adsorption capacity in the finished adsorbent of this invention. Suitable oxides are those of Li, Na, K, Be, Mg, and Ca, with $Na_2O$ being preferred.

The adsorbent of this invention also comprises a promoter which may be a phosphate, an organic amine or a mixture thereof. Choice of promoter is dependent on the characteristics for HCl capacity and Green Oil formation tendency desired in the final adsorbent. For those applications which require the highest HCl removal capacity and minimum tendency for formation of Green Oil, certain phosphates or both a phosphate promoter and an organic amine promoter should be used. Suitable phosphate promoters include (a) the alkali and alkaline earth metal phosphates such as those of Li, Na, K, Be, Mg and Ca, and (b) organic amine phosphates having the general formula $(R_3N)_3PO_4$ wherein $R_3N$ represents any organic amine, which may also be formed in situ by the simultaneous addition of an organic amine and phosphoric acid. Sodium phosphate and potassium phosphate are particularly preferred.

Any organic amine may be used as a promoter, with diethanolamine (DEA) being preferred. The amount of promoter used should be such that the final adsorbent comprises between about 0.5 wt. % and about 25 wt. % promoter as a percentage of its activated alumina. Adsorbents of this invention may have up to about 20 wt. % phosphate promoter and up to about 20 wt. % organic amine promoter when the percentage promoter is expressed as wt. % on activated alumina. The preferred adsorbent comprises 20 wt. % sodium phosphate and 1.5 wt. % DEA.

These strongly basic promoters serve to improve chloride loading capacity by providing additional sites for HCl neutralization as well as neutralization of any resultant phosphoric acid, $(H_3PO_4)$ formed:

$$3HCl + M_3PO4 \rightarrow 3MCl + H_3PO_4$$

where M=Li, Na, K, Be, Mg or Ca $$3HCl + (R_3NH)_3PO_4 \rightarrow 3R_3NH^{+-}Cl + H_3PO_4$$

where $R_3N$=any organic amine $$HCl + R_3N \rightarrow R_3NH{+-}Cl$$

$$H_3PO_4 + R_3N \rightarrow R_3NH^{+-}H_2PO_4$$

These strongly basic promoters also serve to inhibit the physical adsorption of HCl on the alumina and neutralize the alumina's inherently acid sites, thereby minimizing catalytic activity towards the formation of Green Oil.

Adsorbent Preparation

Methods for activation of alumina are well known in the art. One technique which has been found to be particularly useful is described in U.S. Pat. No. 2,915,365 (Saussol), incorporated herein by reference. In a common method of obtaining an activated alumina, an alumina hydrate, e.g. bauxite, is heated at a high temperature generally for a very short period of time in a process known as flash calcination. Typically, flash calcination or activation involves temperatures of 400° C.–1000° C. with contact times of the order of 1 to several seconds, typically about 1 second. During this activation, the alumina starting material is converted from a very low surface area hydrate to a high surface area material.

As a starting material to obtain the activated alumina, any number of various aluminas or alumina containing materials can be employed. For example, essentially pure aluminas such as alumina trihydrate, pseudoboehmite, or alpha alumina imonohydrate can be used. A particularly convenient source of alumina starting material is gibbsite, a form of alumina trihydrate, which is manufactured by the well known Bayer process. This product is readily available commercially and typically has a particle size of 90–100 microns. In addition, the alumina containing material can comprise materials such as bauxite or, indeed, can be other alumina bearing sources such as beneficiated clays. Another useful source of alumina containing materials are aluminas, e.g. boehmite, obtained from the hydrolysis of aluminum alkoxides. In general, the starting material alumina should have a minimum alumina ($Al_2O_3$) content of at least about 40% by weight calculated on the basis of its dry weight, i.e., after ignition at 1000° C. for one hour. The alumina used in the adsorbent must be reduced in size to the 1–10 micron range, either before or after being flash calcined, but in any event before being impregnated with alkali metal- or alkaline earth oxide.

Impregnation of the activated alumina with alkali metal- or alkaline earth-oxide may be accomplished by mixing alumina with metal oxide precursors such as carbonates, hydroxides and carboxylates (e.g., $Na_2CO_3$, NaOH, NaOC(O)$CH_3$, respectively). The use of carbonate (e.g., $Na_2CO_3$) as the precursor is preferred because the carbonate results in superior HCl adsoption capacity in the finished adsorbent. Application of the precursor to alumina may be accomplished by standard methods well known to those skilled in the art, including both wet and dry blending. For example, by using a rotating pan, and spraying in an aqueous solution of the alkali metal salt, nodules of adsorbent in the form of spheres can be formed. In this process using a pan nodulizer, the activated alumina powder is fed into the rotating pan at a steady rate using a constant rate feeder. An aqueous solution of the alkaline metal salt is sprayed onto the alumina powder while it is in the constantly rotating pan. This process steadily turns the alumina powder into spheres which continually grow until they reach the desired size, usually from about 2 mm to about 4 mm in diameter. While the preferred form of the adsorbent are nodules such as spheres, it will be recognized that any shape can be employed. Thus, cylindrically shaped pellets, irregular lumps, or virtually any other shape can be employed.

In cases where the alumina containing material is a hydratable alumina, e.g. bauxite, alumina trihydrate, etc., it is necessary that after it has been promoted with the alkali metal salt and shaped into the appropriate form, it must be cured so that the alumina can be rehydrated. It will be understood, in this regard, that there are commercially available aluminas which can be employed as the alumina containing material and which, even after activation, do not require curing, i.e. rehydration. Rehydration of activated alumina is generally an exothermic reaction and usually requires no additional heat. However, if ambient temperature conditions warrant, heat can be added during the curing process so as to maintain the curing temperature of the shaped adsorbent at above about 50° C., and preferably above about 60° C., for a period of time sufficient to rehydrate the alumina. The rehydration/curing process can be conducted in as little as several minutes if carried out under certain conditions. Alternately, the rehydration process can occur for extended periods of time as, for example, up to 20 hours or longer. It will be understood that in the curing process water must be present to provide the water of hydration. In cases where the shaped adsorbent has been formed by spraying a water solution of the alkali metal salt onto the nodules as they are formed, the requisite water is already present in the shaped material. However, if required, the necessary amount of water for hydration may be supplied by the appropriate addition of water vapor using above ambient pressures if necessary.

In the next step of the method of making the adsorbent, the shaped scavenger, cured if necessary, is heat treated at a temperature of between about 300° C. and about 555° C., more preferably between about 400° C. and about 500° C., and most preferably between about 425° C. and about 480° C., for a period of between about 10 minutes and 60 minutes, preferably between about 20 minutes and 40 minutes. This heat treating can be accomplished in a standard type of activator well known to those skilled in the art. During this heat treating or activation step, a major portion of the water of rehydration is removed from the scavenger. Additionally, to optimize the physical strength and porosity of the material, it is desirable during the heat treating process to reduce the LOI below about 3% by weight, preferably in the range of from about 2% to about 3% by weight. This heat treatment of the blended material decomposes the alkali metal or alkaline earth salt precursors, yielding a product containing the corresponding metal oxide as the active impregnating species.

The resultant metal oxide-impregnated alumina, henceforth referred to as the alumina substrate as it relates to the present invention, typically contains a final metal oxide content of between 0 to 20% by weight on alumina ($Al_2O_3$).

It is an important aspect of this invention that commercially available alkali metal- and alkaline earth-oxide promoted activated alumina, such as CL-750 manufactured by Alcoa or Chlorocel-800 manufactured by Porocel, may be used as the base material to which one or more of the promoters of this invention may be applied.

The promoter formulation is incorporated into the alumina by impregnation after final heat treating of the alumina substrate. This is accomplished by preparation of an aqueous solution containing the desired concentrations of both organic amine and either phosphate salt or phosphoric acid, with individual concentrations being such as to yield between 0 and 20% of each promoter by weight on alumina substrate in the final product. This aqueous solution is added to the alumina substrate in a volume such as to saturate approximately 90 to 95% of all available pore volume of the alumina substrate material, a condition sometimes referred to as incipient wetness.

In the final step of the method of making the adsorbent, the adsorbent is dried at a temperature of between 100° C. and 150° C. to remove the bulk of the water introduced with the aqueous-based promoter solution. This results in the deposition of a fine coating of amine and/or phosphate salt throughout the entire pore structure of the alumina substrate. After drying, the adsorbent is ready for its intended use.

In summary, the preparation of the HCl adsorbents of the present invention are prepared stepwise as follows:
Use of a commercially available alkali metal oxide-impregnated alumina substrate material or preparation of such by:

1) Thermal activation of aluminum hydrate powder.
2) Forming of activated powder with incorporation of metal oxide precursor.
3) Curing of formed powder.
4) Heat treating of formed powder, resulting in the decomposition of metal oxide precursor salts to the metal oxide.

Preparation of the adsorbent of the present invention by:

5) Saturation with aqueous-based solution of amine and/or phosphate salt.
6) Drying to remove excess water.

Removal of HCl From Fluids

The promoted activated alumina adsorbent of the present invention can be readily employed in the removal of HCl from an industrial fluid, i.e., both gas and liquid, streams. Generally, in a typical process, the removal of HCl is accomplished by providing a suitable adsorber vessel charged with the adsorbent to form a fixed bed, and the HCl-contaminated fluid is conducted through the adsorber, either in a downflow or an upflow manner. It has been observed that the best scavenging activity can be achieved by treating such streams containing up to 1.0% by volume HCl. Larger quantities of HCl in the streams may cause premature saturation of the scavenger with the possibility of having an undesired early break-through and consequent corrosion and environmental problems. It has been found that the adsorbent of the present invention is effective in removing HCl from fluid streams even when the level of HCl is less than 1 ppm by volume. Further, it has been found that, even if the HCl contamination of the fluid stream is in the range of from about 2 to about 4 ppm, the adsorbent is still capable of reducing the HCl concentration to levels below the 1 ppm. The adsorbent of the present invention will also perform effectively in the presence of water, e.g. as vapor, in the gas being purified.

Purification of HCl-contaminated fluid streams with the adsorbent of the present invention is generally continued until the fluid exiting from the adsorber is observed to have an HCl content above the desired level. At this stage, the fluid to be purified is conducted into a column filled with fresh promoted adsorbent, or, if only one adsorber is available it is temporarily bypassed, and the used adsorbent is either discarded or employed for other purposes.

To more fully illustrate the invention, the following non-limiting examples are presented. In addition to conducting the following described studies on adsorbents prepared under the scope of the present invention, two commercial chloride adsorbents which were not promoted with either phosphate or amine, Porocel's Chlorocel 800 (which contains ~4% by weight sodium as $Na_2O$) and Alcoa's CL-750 (which contains ~9% by weight sodium as $Na_2O$) were also tested for comparison.

EXAMPLE 1

This example describes the preparation of various adsorbents of the present invention starting with gibbsite powder.

Gibbsite powder was flash calcined at 950° C. to 1000° C. for 1 to 2 seconds to produce an alumina powder in a size range of 1–10 microns. The calcined alumina had a surface area of about 250 $m^2$/g to about 300 $m^2$/g. The powdered calcined alumina was fed to a pan nodulizer and sprayed with an aqueous solution of sodium carbonate until the formed nodules reached the desired size of 1.5 to 3 millimeters in diameter. The concentration of the aqueous solution of sodium carbonate was such as to achieve a final $Na_2O$ content of approximately 4% by weight to aluminum oxide ($Al_2O_3$) in the final product. The formed nodules were cured at 100° C. for 6 hours. Following curing, the nodules were heat treated up to a final temperature of 420° C. for about 1 to 1.5 hours. At this point, the formed nodules constituted Chlorocel 800, as manufactured by Porocel Corporation. Following heat treating and subsequent cooling to ambient temperature (5° C. to 40° C.), the nodules were wetted to incipient wetness with various aqueous solutions of diethanolamine and phosphate to yield the promoted adsorbents having compositions shown in Table 1. The treated nodules were than dried at 150° C. to remove free moisture to produce the final products.

EXAMPLE 2

This example describes the preparation of an adsorbent of the present invention starting with a commercially available alkali oxide-impregnated activated alumina adsorbent.

Samples of Alcoa CL-750 were wetted to incipient wetness with various aqueous solutions of diethanolamine and phosphate to yield the promoted adsorbents having compositions shown in Table 1.

EXAMPLE 3

This example describes the determination of the capacity for HCl adsorption of the adsorbents prepared in Examples 1 and 2.

The adsorbents prepared in Examples 1 and 2 were tested for HCl adsorption capacity by loading a 2.54 cm. (1.0") diameter stainless steel reactor column packed with the adsorbent through which a nitrogen stream containing 1.0% by volume HCl was passed at a constant flow rate. Testing conditions utilized 25 $cm^3$ of nominally sized 3.175 mm. (⅛") spherical media at a temperature of 75° C. a pressure of 1.0 atmosphere, and a gas flow rate of 600 $cm^3$/min. Monitoring of the effluent for chloride breakthrough was accomplished by use of an aqueous scrubber through which the gaseous reactor effluent was sparged. Changing pH of the scrubber provided quantitative indication and measurement of chloride breakthrough and subsequent adsorbent chloride loading. The times till HCl breakthrough for the various adsorbents of the present invention are compared to those of two commercially available adsorbents in Table 1. In Table 1, breakthrough time is the length of time an adsorbent prevented appearance of HCl in adsorber effluent and Cl⁻ loading is the wt. % chloride on spent adsorbent from the adsorber. It is clear from these data that the addition of phosphate and/or amine promoters to the alumina substrate had a beneficial effect on HCl capacity.

EXAMPLE 4

This example demonstrates the reduced tendency of the adsorbents of the present invention to catalyze the formation of Green Oil.

The adsorbents prepared in Examples 1 and 2 and evaluated in Example 3 were tested for catalytic activity by exposure of the chlorinated adsorbents (spent material from Example 3) to a butadiene stream at 150° C., using visual inspection for discoloration as qualitative indication of reactivity. Two to five grams of chlorinated adsorbent were loaded into a stainless steel reactor and placed in an oven whose temperature was set at 150° C. A slow-flowing, uninhibited butadiene stream (~20 $cm^3$/min) was purged through the reactor for 30 minutes, after which time the reactor was removed from the oven and unloaded for adsorbent inspection. Pre- and post-chlorinated adsorbents are snow-white or light gray in appearance. Exposure of highly reactive butadiene to a sufficiently acid material, in this case chlorinated alumina, will catalyze butadiene polymerization, resulting in production of polymer that imparts a deep color (typically red or brown) to the adsorbent material. All materials prepared in Examples 1 and 2 which contained potassium phosphate or amine in the formulation yielded no or only trace discoloration upon exposure to butadiene under the above conditions. Control samples of chlorinated Chlorocel 800 (a commercially available HCl adsorbent manufactured by Porocel) and CL-750 (a commercially available HCl adsorbent manufactured by Alcoa) showed moderate discoloration. Comparative results are summarized in Table 1 wherein 0=None; 1=very slight; 2=slight; 3=moderate; 4=heavy and 5=very heavy.

EXAMPLE 5

The physical properties of crush strength, resistance to steaming, and resistance to soaking in water were determined for all adsorbents, both prior to and after chlorination. Results are summarized in Table 1. In Table 1, soak test refers to the exposure of fully chlorinated material to water for 1 hour and steam test refers to exposure of fully chlorinated material to steam for 30 minutes ("Pass" indicates material maintained its physical integrity).

TABLE 1

| Adsorbent Example 1: (1) | Crush Strength, kg. (lbs.) | Soak Test | Steam Test | Green Oil | HCl Removal Breakthrough Time, minutes | HCl Removal Cl⁻ Loading, wt. % |
|---|---|---|---|---|---|---|
| C-0-5 | 13.8(30.4) | Pass | Pass | 0 | 190 | 8.5 |
| C-11K-0 | 16.1(35.6) | Pass | Pass | 0 | 220 | 9.8 |
| C-20Na-0 | 9.8(21.7) | Pass | Pass | 3 | 250 | 11.2 |
| C-20Na-1 | 13.6(30.0) | Pass | Pass | 2 | 260 | 11.6 |
| C-20Na-1.5 | 13.6(30.0) | Pass | Pass | 2 | 265 | 11.9 |
| C-1.5PA-5 | 12.3(27.2) | Pass | Pass | 1 | 210 | 9.4 |
| A-0-5 | 10.6(23.3) | Pass | Pass | 0 | 264 | 11.8 |
| A-11K-0 | 10.4(22.9) | Pass | Pass | 0 | 334 | 14.9 |
| Chlorocel 800 | 32.0 | Pass | Pass | 4 | 140 | 6.3 |
| Alcoa CL-750 | 30.0 | Pass | Pass | 3 | 246 | 11.0 |

1) Promoted alumina substrate materials prepared in Examples 1 and 2. Letter designates source of alkali-impregnated activated alumina (A = Alcoa CL-750, C = Porocel Chlorocel 800 prepared in Example 1). First number designates percentage by weight on alumina substrate added as phosphate (Na = sodium phosphate-dodecahydrate, K = potassium phosphate, PA = phosphoric acid). Second number designates percentage of DEA by weight on alumina substrate. For example,C-2ONa-1 refers to a material comprising activated alumina impregnated with 4 wt. % $Na_2O$ and promoted with 20 wt. % $Na_3PO_4$-12 $H_2O$ and 1 wt. % DEA.

I claim:

1. The method of removing HCl from a fluid that contains up to about 1% by volume HCl, comprising contacting said fluid containing HCl with an effective scavenging amount of an activated alumina adsorbent promoted with an oxide selected from the oxides of alkali metals and alkaline earth metals and, additionally, with between about 0.5 wt. % and about 25 wt. % based on the weight of the activated alumina of a promoter selected from a phosphate, an organic amine, and mixtures thereof.

2. The method of claim 1, wherein the phosphate is selected from the group consisting of the phosphates of Li, Na, K, Be, Mg and Ca, and the phosphates of organic amines.

3. The method of claim 2 wherein the phosphates of organic amines are selected from the group consisting of phosphates of monoethanolamine, diethanolamine and trimethylamine.

4. The method of claim 1, wherein the organic amine is selected from the group consisting of monoethanolamine, diethanolamine and trimethylamine.

5. The method of claim 1 wherein the activated alumina is promoted by coformation with $Na_2O$ or a precursor thereof.

6. The method of claim 5, wherein the phosphate is selected from the group consisting of the phosphates of Li, Na, K, Be, Mg and Ca, and the phosphates of organic amines.

7. The method of claim 6 wherein the phosphates of organic amines are selected from the group consisting of phosphates of monoethanolamine, diethanolamine and trimethylamine.

8. The method of claim 5, wherein the organic amine is selected from the group consisting of monoethanolamine, diethanolamine and trimethylamine.

* * * * *